July 11, 1967

G. ALBERTUS 3,330,046

METHOD AND APPARATUS FOR EXCHANGING HEAT BETWEEN
SOLID PARTICLES AND GASES

Filed March 22, 1963

INVENTOR.
Gundorph Albertus
BY
Pennie Edmonds Morton Taylor Adams
ATTORNEYS

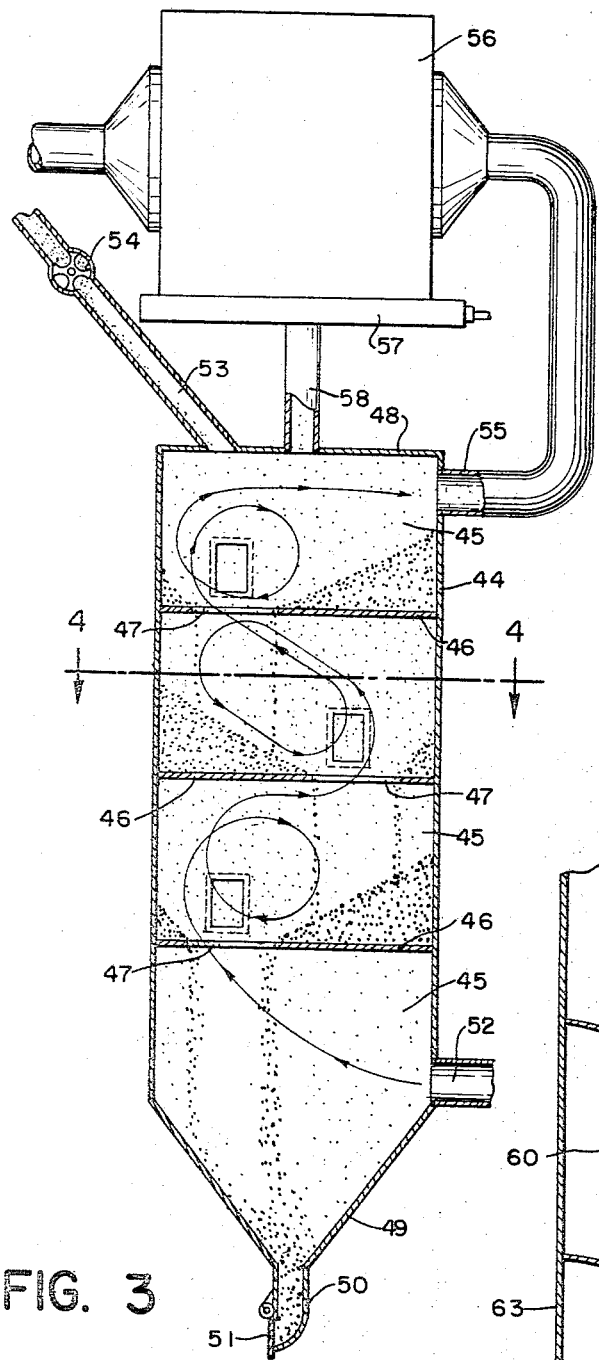
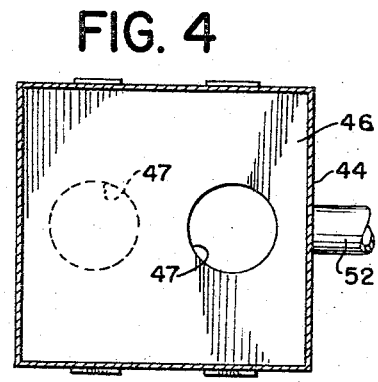
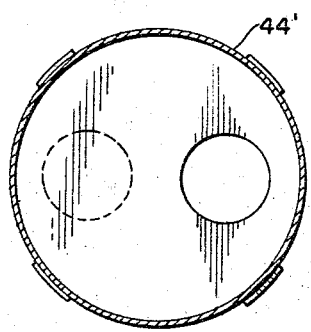
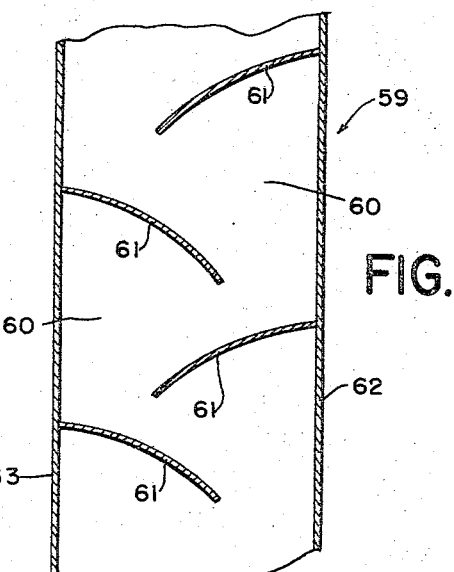

July 11, 1967

G. ALBERTUS 3,330,046

METHOD AND APPARATUS FOR EXCHANGING HEAT BETWEEN
SOLID PARTICLES AND GASES

Filed March 22, 1963

INVENTOR.
Gundorph Albertus
BY
ATTORNEYS

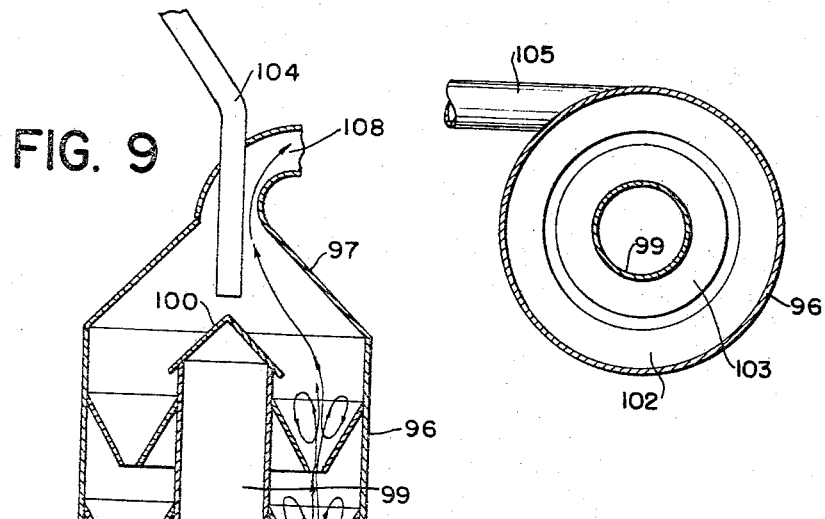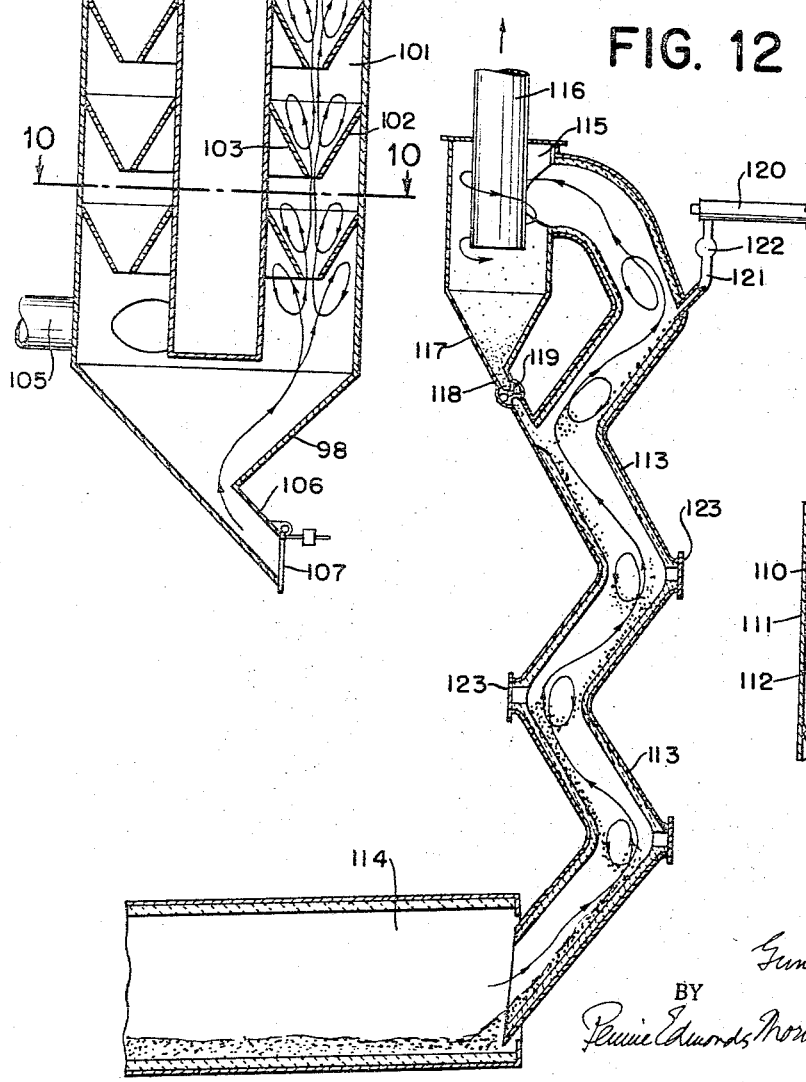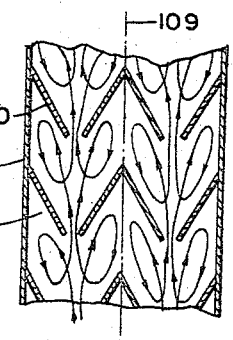

3,330,046
METHOD AND APPARATUS FOR EXCHANGING HEAT BETWEEN SOLID PARTICLES AND GASES
Gundorph Albertus, Copenhagen-Valby, Denmark, assignor to F. L. Smidth & Co., New York, N.Y., a corporation of Delaware
Filed Mar. 22, 1963, Ser. No. 267,104
Claims priority, application Great Britain, Mar. 22, 1962, 11,023/62
11 Claims. (Cl. 34—10)

This invention relates to heat exchange between solids and gases and is concerned more particularly with a novel method and apparatus for effecting heat exchange between particles of a material and a gas. The particles, which are heated or cooled in the practice of the method of the invention, are very fine and, by that term, I refer to particles which have an average size less than 50 microns as, for example, 20 microns.

The most efficient heat exchange between particles and a gas is effected when the particles move in countercurrent to the gas and the most convenient method involves introducing the particles into an upward current of gas near its upper end with the particles descending by gravity through the current while the heat transfer takes place. Ordinarily, a problem to be solved in effecting such heat transfer between particles falling freely through a gas current is that of retarding the particles sufficiently to obtain an efficient heat exchange but, when the particles are very fine and thus dust-like, difficulties arise because of the entrainment of the particles by the gas so that countercurrent travel of the particles is not obtained.

In the practice of the method of the invention, very fine solid particles are caused to travel mainly in countercurrent to a current of gas flowing in a generally upward direction at a velocity greater than the free-settling velocity of the particles. By the term "free-settling velocity," I refer to the velocity which solid particles of a given size and weight at a given temperature will quickly assume when falling freely in a stationary gas at the given temperature. The downward movement of the particles through the gas traveling at a velocity greater than the free-settling velocity of the particles is then brought about primarily by causing turbulence of the stream in spaced regions, in which the gas flows in circulatory paths, with the result that some of the entrained particles are precipitated from the gas. Such precipitated particles are collected in a mass and returned to the stream between the regions of turbulence, and the collected particles then move countercurrent to the gas to the next region of turbulence, where the action is repeated.

The apparatus for the practice of the method of the invention includes a number of chambers, through which the gas stream passes consecutively. These chambers may be separate and spaced from one another but they are preferably formed within a vertical shaft by partitions with openings, through which the gas stream passes from one chamber to the next. The precipitated particles collected in each chamber land upon a surface sloping downwardly toward the opening, through which the gas flows from the chamber beneath, and the collected particles slide down the surface and then pass through the opening countercurrent to the gas. The velocity of the gas traveling through such an opening may be substantially greater than the free-settling velocity of the powdered material and, as the gas at this relatively high velocity enters the following chamber, the gas becomes turbulent with the effects above set forth. Although the velocity of the gas traveling through an opening between two chambers may be as much as 40 times the free-settling velocity of the particles, continuous downward flow of the particles from chamber to chamber takes place and it is possible to discharge particles from the lowermost chamber at an average rate equal to that of which they are introduced.

To insure the circulatory flow the gas within the chambers, the openings between successive chambers may advantageously be offset and, preferably, there should be only a single opening between adjacent chambers with the cross-sectional area of the opening between two chambers ranging from 15% to 45% of that of the chambers. In each chamber, the average velocity of the gas, that is, the velocity which the gas would attain if allowed to distribute itself uniformly throughout the cross-section of the chamber, is greater than the free-settling velocity of the particles but not as great as the velocity of the gas traveling through the openings. The precipitation of the particles in the regions of turbulence results from the action of centrifugal forces, to which the particles are subjected, and the precipitated particles slide down the walls and along the bottom of the chamber, which preferably slopes toward the opening communicating with the next lower chamber. Preferably, the chambers are of such shape that, in the circulatory movement of the gas in a chamber, the gas travels concurrently with the preciptated material in the movement of the latter toward the opening to the chamber next below. The material is discharged from the lowermost chamber and the discharge may be through one opening while the gas is introduced through another.

The gas velocity through the openings between the chambers may range from 15 to 20 feet per second and the greater the velocity, the greater the amount of material carried out of the top chamber by the gas current. The gas leaving the top chamber is, accordingly, conducted to a precipitator which traps the major portion of the particles entering it and may be of the electrical type, although a cyclone is preferable. It is generally advantageous to pass the gas through the cyclone to a dust filter, such as an electrostatic filter, in order to remove residual dust entrained by the gas. Part or all the particles collected in the precipitator and filter may advantageously be returned to the heat exchanger, although not necessarily to the top chamber. The amount of material thus returned varies but, at the higher velocities of gas traveling through the openings between consecutive chambers, the amount may be four or more times that of the amount of fresh material introduced into the gas current.

The invention is particularly useful in the preheating of very fine particles of material to be burned in a kiln with the waste gases from the kiln forming the gas current, an example of such particles being the raw meal to be burned to produce cement clinker. However, the particles may be of minerals containing calcium carbonate or ores of different kinds, which are to be calcined or sintered. Another example of a material with which the invention may be practiced, is aluminum hydroxide which is usually available as a filter cake in the form of a moist powder, which should be preheated before introducing it into a kiln to calcine it to obtain alumina.

The method and apparatus of the invention may also be applied to the cooling of very fine particles, such as particles of cement or of alumina produced by calcination of aluminum hydroxide. For cooling purposes, the gas may be atmospheric air, which, after being heated, may in some instances be used as secondary air of combustion in a kiln.

For a better understanding of the invention, reference may be made to the accompanying drawings, in which FIG. 1 is a vertical sectional view of a form of the heat exchanger of the invention;

FIG. 3 is a vertical sectional view of another form of the heat exchanger;

FIG. 4 is a sectional view on the line 4—4 of FIG. 3;

FIG. 5 is a sectional view similar to FIG. 4 of a modified form of the heat exchanger;

FIG. 6 is a fragmentary vertical sectional view of another modified form of the heat exchanger;

FIG. 9 is a vertical sectional view of another form of the heat exchanger;

FIG. 10 is a sectional view on the line 10—10 of FIG. 9;

FIG. 11 is a fragmentary vertical sectional view of another form of the heat exchanger; and FIG. 12 is a vertical sectional view of a modified form of the exchanger in use with a rotary kiln.

Figure 1:
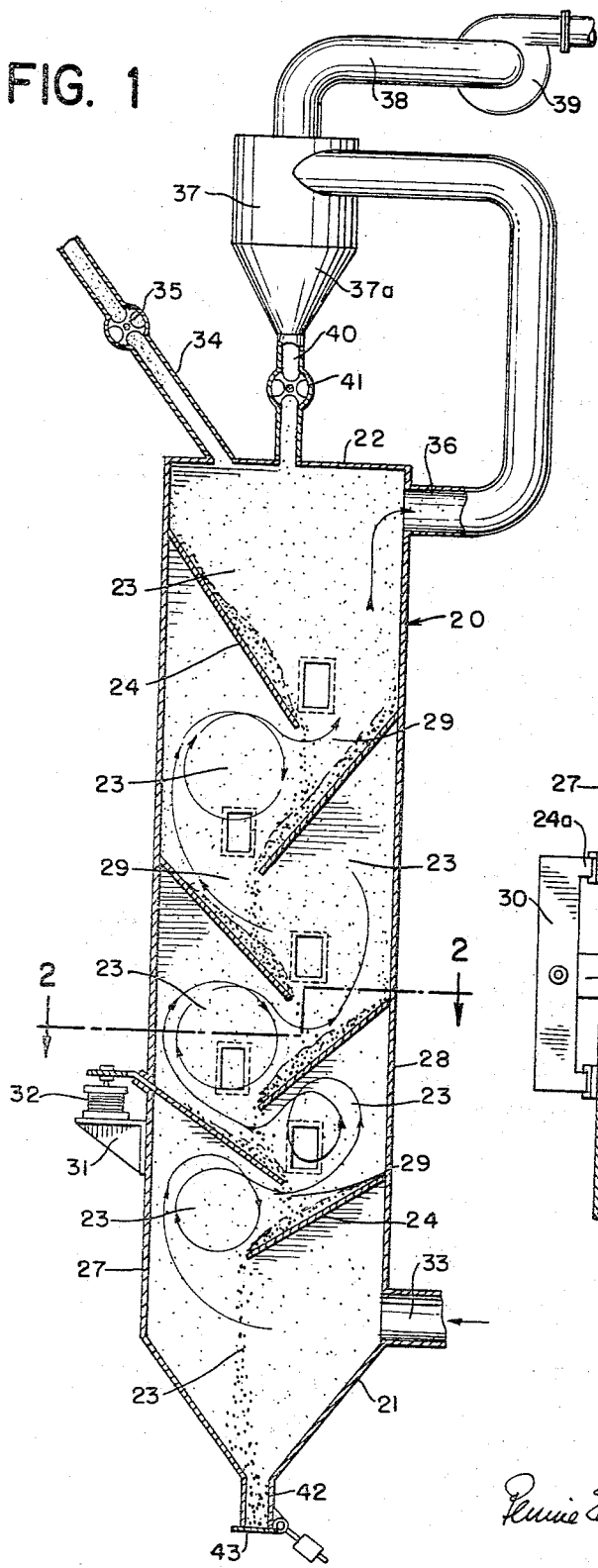
Figure 2:
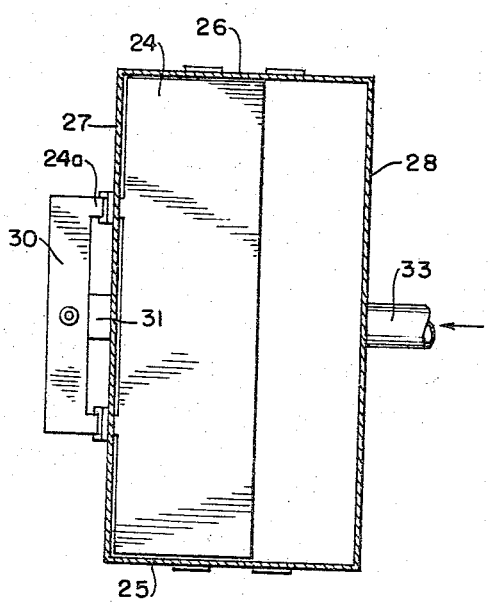
FIG. 2 is a sectional view on the line 2—2 of FIG. 1.

The heat exchanger shown in FIGS. 1 and 2 comprises a rectangular shaft 20 lined with heat-resistant material and provided with a hopper bottom 21 and a flat top plate 22. The interior of the shaft is divided into chambers 23 by partitions 24 which connect the front wall 25 with the rear wall 26 and extend downwardly at an angle from the side walls 27, 28 in alternation. Each partition extends only part way across the shaft and overlies the partition below it, so that openings 29 are left between adjacent partitions and each opening is the sole means of communication between a pair of adjacent chambers. In the heat exchanger illustrated, the angles of the partitions to the horizontal decrease downwardly through the shaft, so that the top partition is substantially steeper than the bottom partition.

If desired, one or more of the partitions 24 may be vibrated and, for this purpose, the partition to be vibrated is provided with extensions 24a, which pass through a side wall of the shaft and are connected outside the shaft by a transverse beam 30 disposed above a bracket 31. An electrical vibrator 32 supported on the bracket is connected to the beam and, when operated, vibrates both the beam and the partition.

The shaft receives hot gas at its lower end through an inlet pipe 33 and the material to be heated is fed into the top chamber 23 through a pipe 34 containing a rotary gate valve 35 and leading to an opening in the top plate 22. The gas leaves the shaft through a pipe 36 leading from an opening in the shaft wall near the top plate 22 to a cyclone separator 37 having a gas outlet pipe 38 leading to the intake of a fan 39. The material collected in the cyclone passes from its hopper bottom section 37a into a pipe 40 containing a rotary gate valve 41 and leading to an opening through the top plate 22.

In the operation of the exchanger described, the hot gas introduced into the shaft through the pipe 33 enters the lowermost chamber 23 and passes in turbulent flow around the edge of the lowermost partition 24 and through the opening 29 between that partition and the one next above it to enter the next higher chamber 23. The gas passes in turbulent flow through each chamber and then flows through the opening into the next higher chamber, ultimately leaving the shaft through the pipe 36. The particles of material fed into the top chamber through the pipe 34 are entrained in the turbulently flowing gas and a proportion of the particles is precipitated on the top partition 23. The precipitated particles apear to aggregate and the aggregated particles slide along the partition and enter the air stream passing through the opening leading into the top chamber. As the particles enter the air stream, some of them are entrained and returned to the top chamber while others travel countercurrent to the stream and enter the next lower chamber, where they are precipitated on the next lower partition. The precipitated particles than slide downwardly along that partition and the actions described are repeated.

After the apparatus has been in operation for a period of time, each chamber contains turbulently flowing gas, from which entrained particles are precipitated on the walls of the chamber and on the partition defining the bottom of that chamber. The particles so precipitated aggregate and slide along the surfaces, on which they are deposited, to enter and travel countercurrent to the stream of gas passing through an opening between two partitions and entering the chamber, in which the particles were precipitated. Particles are thus precipitated in successively lower chambers and travel countercurrent through the gas stream entering the respective chambers in which the particles were deposited, until the particles enter the hopper bottom 21 of the shaft. The gas leaving the shaft through the pipe 36 contains entrained particles, which enter and are precipitated in the cyclone 37, and the material collected in the cyclone is then returned into the top chamber in the shaft with the fresh material. The particles precipitated in the lowermost chamber enter the hopper bottom, from which they are discharged through a pipe 42 provided with a flap valve 43 to prevent atmospheric air from entering the exchanger.

After an initial period of operation of the exchanger, a state of equilibrium will be reached, in which the average rate of discharge of the particles through the pipe 42 equals the rate of supply through the pipe 24. The travel of the particles through the exchanger is slow, so that the particles are subjected to a prolonged heat exchange with the hot gas. The time taken by an average particle to pass through the exchanger is a multiple of the time, which would be required for the particle to pass at the same velocity from the top of the shaft to the lower end of the hopper bottom of the shaft along the shortest possible path. The heat exchange is consequently highly efficient.

The form of the exchanger shown in FIG. 3 includes a shaft 44 subdivided into chambers 45 by horizontal partitions 46, each of which has a single opening 47. The shaft has a flat top plate 48 and a hopper bottom 49, from which leads an outlet pipe 50 closed by a flap valve 51. The hot gas enters the lowermost chamber 45 through a pipe 52 and then flows into the next chamber above through the opening 47. The openings through the partitions are staggered to insure that the gas will pass in turbulent flow through the successive chambers. The fresh material enters the top chamber through a pipe 53 containing a rotary gate valve 54 and the gas leaving the top chamber is conducted through a pipe 55 to a dust precipitator 56 of the electrical type. The material collected in the precipitator enters a screw conveyor 57 with flights of opposite hand which advance the material to a pipe 58 leading to the top chamber 45. The screw conveyor acts as a seal and thus makes unnecessary the provision in pipe 58 of a gate valve for preventing gas from entering the precipitator.

In the operation of the exchanger shown in FIG. 3, the fresh material entering through the pipe 53 and the material returned from the precipitator 56 enter the turbulent gas stream in the top chamber 45 and particles are thrown out of the stream and land upon the partition. After an initial period of operation, the particle deposit on the partition has a surface sloping toward the opening 47 and, as the deposit of particles continues and the particles aggregate, the aggregated particles slide down the sloping surface and pass through the opening 47 countercurrent to the gas stream flowing through the opening and enter the next lower chamber. Particles entering the second chamber are again thrown from the turbulent gas stream within that chamber and are deposited upon the mass of particles resting on the partition defining the bottom of the chamber. As before, the surface of the deposit slopes through the opening at the partition and the particles slide down the deposit and travel countercurrent through the gas stream entering the chamber through the opening in the partition. The operations described are repeated until the particles finally reach the lowermost chamber and collect in the hopper bottom 49 of the shaft to be withdrawn through the pipe 50. In the exchanger shown, the gas stream traveling in contact with the sloping surface of particles deposited in each chamber flows along that surface toward the opening leading to the next lower chamber and this facilitates the movement of the particles toward the opening.

The shaft 44 of the exchanger shown in FIG. 3 is square in cross-section and that form is preferred. However, if desired, the exchanger may have a shaft 44′ of circular cross-section.

The form of the exchanger shown in FIG. 6 includes a shaft 59 subdivided into chambers 60 by partitions 61 extending inwardly part way across the exchanger from opposite walls 62, 63 in alternation. The partitions 61 are not flat but are curved in such manner that the angle of slope of each partition increases toward the free edge of the partition. Formation of the partitions with the curvature described facilitates the travel of the deposited particles along the partitions.

Figure 7:
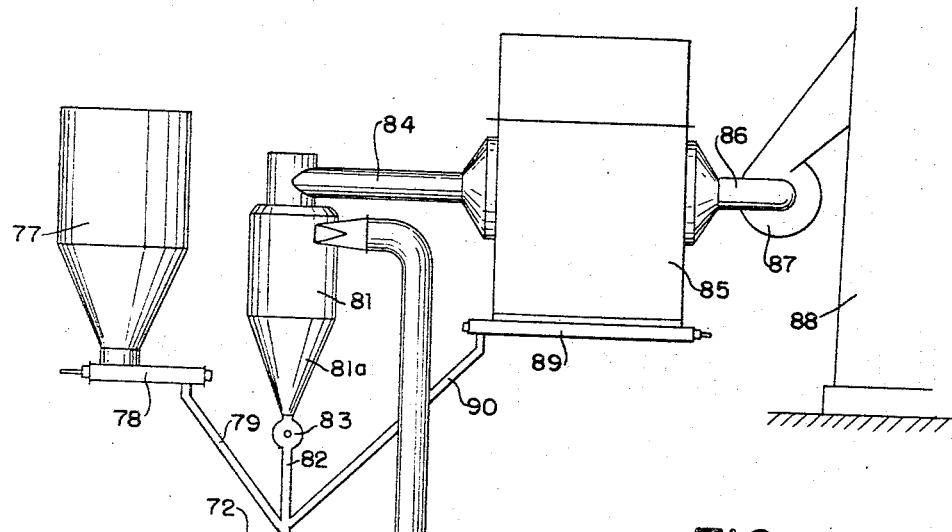
FIG. 7 is a view, partly in elevation and partly in vertical section, showing the heat exchanger in use with a rotary kiln.

In FIG. 7, the heat exchanger 64 of the invention is shown in use as a preheater for raw meal to be burnt to cement clinker in a kiln 65 supported for rotation on live rings 66, only one of which is shown. The ring rests upon rollers 67 on a foundation 68 and the kiln is driven by the conventional circumferential gear. The kiln is formed with a tapering mouth 65a which projects into an opening in the lower part of the shaft 69 of the heat exchanger. To avoid air from being drawn into the heat exchanger around the mouth of the kiln, a seal 70 is provided between the kiln and the shaft.

The shaft 69 is supported on columns 71 and has a flat top plate 72 and a bottom 73 sloping toward the kiln mouth and of trough shape as indicated at 73a. The interior of the shaft is subdivided into a vertical series of chambers 74 by partitions 75 extending inwardly and downwardly from opposite side walls. The partitions may have the arrangement shown in FIG. 1 or 3 but those illustrated are mounted on the opposite side walls of the shaft in pairs and define a series of openings 76 spaced along the vertical axis of the shaft.

The raw meal is stored in a hopper 77 and is discharged therefrom by a screw conveyor 78 into a pipe 79 leading to the top of the heat exchanger. The gases leaving the exchanger are conducted through a pipe 80 to a cyclone 81 having a hopper bottom 81a, from which the material collected in the cyclone is conducted to the top of the exchanger through a pipe 82 containing a rotary gate valve 83. The gases leaving the cyclone through a pipe 84 enter an electrostatic dust filter 85, in which very fine particles are removed from the gas stream. The cleaned gas leaving the filter travels through a pipe 86 to the inlet of a fan 87 having its outlet connected to a chimney 88 and the dust collected in the filter enters a screw conveyor 89 and is led therefrom into the top of the shaft 75 through a pipe 90.

In the operation of the apparatus shown in FIG. 7, the hot gas leaving the kiln enters the lowermost chamber 74 within the shaft 64 and spreads out beneath the partitions of the lowermost pair and assumes a turbulent condition. Gas also flows through the opening between the lower edges of these partitions into the chamber 74 next above, where the stream again becomes turbulent. The gas proceeds as described to the top of the shaft and then passes to the cyclone. By spacing the pairs of chambers vertically the proper distance, it is possible to insure that the gas stream will spread out and become turbulent in each of the chambers with the gas in each half of the chamber traveling along the surface of one of the partitions toward the opening to the next lower chamber. The fresh material, together with that collected in the cyclone and in the dust filter, enter the shaft through the top plate and land upon a deflector 91. The particles are then entrained in the turbulent stream within the top chamber and some of the particles are precipitated on the top partitions.

When a sufficient quantity of particles has collected on each partition and the particles have aggregated, the particles slide along the partition concurrent with the gas stream above the partition. The particles sliding off the surfaces of a pair of partitions travel countercurrent to the gas stream flowing through the opening between those partitions and enter the next lower chamber, where they are again subjected to the turbulent flow of the gas with resultant precipitation on the partitions defining that chamber. The operations described continue until, ultimately, the particles collect on the sloping bottom 73 of the exchanger and enter the mouth of the kiln.

Figure 8:
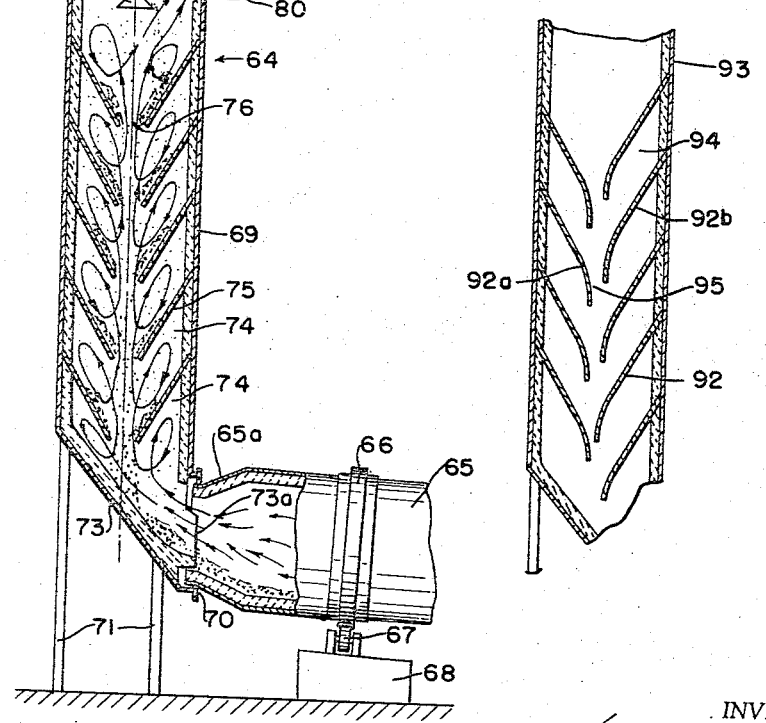
FIG. 8 is a fragmentary vertical sectional view of a modified form of the heat exchanger of FIG. 7.

In the exchanger shown in FIG. 7, the partitions 75 of each pair extend from opposite walls of the exchanger at the same level and have lower edges in the same level but, if desired, the exchanger may include partitions 92 shown in FIG. 8. These partitions are arranged in pairs with the partitions of a pair starting from the side walls at different levels. Each partition is flat for a part of its length and then has a section adjacent its free edge, which curves downwardly to lie substantially parallel with the vertical axis of the exchanger and at one side of the axis. The free edges of the partitions terminate at different levels and, with the arrangement described, the gas stream entering a chamber 94 through an opening 95 is subdivided into two streams by the lower edge of the lower partition 92a and one of the streams is further subdivided into two streams by the lower edge of the higher partition 92b. This insures turbulent flow of the gas within the chambers.

The form of the exchanger shown in FIGS. 9 and 10 is particularly suitable for use with a large rotary kiln. The exchanger includes an outer cylindrical casing 96 having a conical top 97 and a conical bottom 98. A cylindrical casing 99 with a conical top 100 is mounted coaxially with the casing 96 and with it defines an annular passage within the casing 96. The passage is divided into chambers 101 by frusto-conical partitions 102, 103 which extend inwardly from the casing 96 and from the casing 99, respectively. The material to be heated is conducted into the casing 96 through a pipe 104 which discharges the material upon the conical top 100 of the casing 99, and the hot gas enters the casing 96 tangentially near its lower end through a pipe 105. The gas moves helically within the casing and then travels upwardly through the annular space between the lowermost partitions 102, 103 to enter the lowermost chamber 101.

After a period of operation, the material distributed within the uppermost chamber 101 by the conical top 100 of the casing 99 is precipitated on the surfaces of the topmost partitions 102, 103 and slides down the partitions to travel countercurrent to the gas flow and enter the next lower chamber 101. The material collected in the conical bottom 98 of the casing 96 is conducted away through a pipe 106 having a flap valve 107 and the gas issuing from the conical top 97 of the casing is conducted through a pipe 108 to a cyclone and, if desired, to a dust filter, from which the collected material is returned to the casing 96 as described in connection with the apparatus shown in FIG. 7.

In the heat exchanger shown in FIG. 11, two exchangers of the type shown in FIG. 7 are mounted side by side and have a common central wall indicated by the line 109. Each exchanger includes pairs of partitions 110 extending from the common wall 109 and its outer wall 111, respectively. The partitions define successive chambers 112 connected by openings between the partitions of the respective pairs. If desired, the common wall may be omitted.

The velocity of the gas flowing through an opening between adjacent chambers in any of the forms of the heat exchanger described may vary from 15 to 20 feet per second, for example, and the amount of dust, which is entrained and carried upward by the gas stream and ultimately out of the exchanger, depends largely on this velocity. If the velocity is in the range from 15 to 25 feet per second, for example, the amount of dust carried out of the heat exchanger may amount to no more than from 8% to 10% of the fresh particles fed and, in that case, it may be possible to dispense with a dust filter and the associated apparatus for returning material therefrom to the exchanger. If the velocity of the gas stream is greater and of the order of from 25 to 35 feet per second, the particles carried out of the exchanger may amount to about 30% of the feed and, in that case, the use of a dust filter is necessary.

The preheater in the form shown in FIG. 12 includes a shaft 113 which is of zig-zag formation. The lower end of the shaft leads into the mouth of a rotary kiln 114 and the upper end of the shaft is connected to a cyclone 115 having a gas outlet pipe 116. The cyclone has a hopper bottom 117 connected by a pipe 118 containing a gate valve 119 to the shaft at one of the bends and material to be heated is discharged by a screw conveyor 120 into a pipe 121 containing a rotary gate valve 122 and leading into the shaft at the bend near the top. The bends farther down the shaft are provided with cleanout openings closed by doors 123.

After an initial period of operation of the heat exchanger shown in FIG. 12, the fresh material and that returned from the cyclone slides down the surface of one of the sections of the shaft and then enters the gas stream flowing into that section from the section beneath. At each bend in the shaft, the gas stream becomes turbulent, so that particles entrained in it are thrown against the shaft walls, and the collected particles slide down the walls and travel countercurrent to the gas stream flowing from one section into the section above. Within each section, the particles are subjected to the turbulent flow of the gas and precipitation occurs. Ultimately, particles deposited on the surface of the lowermost section slide down that surface into the mouth of the kiln.

The results obtained by the use of the heat exchanger of the invention can be made clear from the following example. The exchanger used was of the construction shown in FIG. 1 except that the shaft of the exchanger was circular in cross-section instead of rectangular. The shaft was 16′6″ high and had an internal diameter of 2′6″ and the area of each opening between adjacent chambers defined by partitions was about 15% of the full cross-sectional area of the shaft. The angle of slope of all the partitions was about 60° to the horizontal.

Gas was introduced into the shaft at a tempertaure of about 1000° C. and left the shaft at a temperature of about 250° C. The velocity of the gas was such that it traveled through each opening between adjacent chambers at about 33 feet per second. Cement raw meal of an average particle size of about 20 microns was introduced into the shaft at ambient temperature at the rate of about 1000 kg. per hour. The free settling velocity of the raw meal was about 1″ per second. After the exchanger had been in operation for a short time, the material was discharged from the bottom of the shaft at a temperature of about 700° C. and at the rate of 940 kg. per hour. The difference in weight between the heated raw meal and the raw meal fed can be accounted for in part by the loss of some of the meal from the cyclone through the air discharge pipe and in part by the calcination of some of the meal during heating with expulsion of carbon dioxide and resultant loss in weight.

I claim:

1. A method of effecting heat exchange between very fine particles and a gas, which comprises:
    (a) providing a vertical uninterrupted series of chambers defined by vertically spaced portions with each chamber directly connected to the one below it solely through a single opening of less cross-sectional area than that of the respective chambers connected by it,
    (b) maintaining a stream of gas through the chambers at a velocity greater than the free settling velocity of the particles,
    (c) introducing very fine particles having an average size less than 50 microns into the stream in the top chamber and entraining them in the gas stream,
    (d) increasing the velocity of the gas stream in passing it through the openings and effecting turbulence of the gas stream by deflecting it against the bottom of one of said partitions in the chambers to describe a circulatory path about a horizontal axis to precipitate particles from the gas in the chamber,
    (e) collecting the particles precipitated in the chamber,
    (f) returning the collected particles to the stream of gas at the opening between chambers by gravity and by the turbulent traveling concurrently with the precipitated particles in their movement toward the opening at least along the lowermost region of the chamber adjacent the opening,
    (g) moving the collected particles countercurrent to the stream and entering the next lower chamber,
    (h) repeating the precipitation and collection of the particles in the successively lower chambers and the return of the collected particles to the stream to travel countercurrent thereto,
    (i) dicharging the gas from the top chamber and separating entrained particles from the discharged gas,
    (j) returning the separated particles to the stream in one of the chambers, and
    (k) discharging from the bottom chamber the particles precipitated therein.

2. The method of claim 1 in which the particles are cement raw meal, the discharged heated particles are conducted to the mouth of a rotary kiln, and the gas is the waste gas issuing from the kiln.

3. The method of claim 1 in which the separated particles are returned to the top region.

4. An apparatus for exchanging heat between very fine particles and an upwardly flowing gas stream which comprises a shaft sub-divided into a plurality of chambers one above the other by partitions extending inwardly and downwardly from the shaft walls, means for maintaining a current of gas flowing in a generally upward direction at a velocity greater than the free-settling velocity of the particles, means provided by the configuration and position of said partitions to render the gas stream turbulent within each chamber and for directing the turbulent gas in a circulatory path about a horizontal axis with the gas traveling toward the sloping partitions concurrent with the precipitated material in the movement of the precipitated material to the stream below the partition at least along the lowermost region of the chamber adjacent the opening, each chamber communicating with the one below it solely by a single opening only defined by the partitions separating the chambers, the opening having a cross-sectional area substantially less than the chamber above, means for introducing very fine particles having an average size of less than 50 microns into the top chamber, means for introducing the gas into the bottom chamber, means for discharging gas from the top chamber, means for separating entrained particles from the gas discharged from the top chamber, and means for returning the separated particles to one of the chambers.

5. The apparatus of claim 4 in which the openings between successive pairs of chambers are laterally offset.

6. The apparatus of claim 5 in which the partitions extend alternately from opposite walls of the shaft and the inner edge of each partition overlaps the partition next below.

7. The apparatus of claim 4 in which the angle of slope of the partitions increase toward the free edges of the partitions.

8. The apparatus of claim 4 in which means are provided for vibrating some of the partitions.

9. The apparatus of claim 4 in which the means for separating entrained particles include a dust collector, a pipe conducts gas from the top chamber to the inlet of the collector, and a pipe connects the solids discharge outlet of the collector to an upper chamber.

10. The apparatus of claim 4 in which the means for separating entrained particles include a dust filter and a pipe connects the solids discharge outlet of the filter to an upper chamber.

11. The apparatus of claim 4 in which the bottom chamber is connected to the mouth of a rotary kiln to receive waste gas therefrom and deliver heated particles thereto.

References Cited

UNITED STATES PATENTS

| | | | |
|---|---|---|---|
| 2,125,263 | 8/1938 | Ahlmann | 263—32 X |
| 2,797,076 | 6/1957 | Muller | 263—32 |
| 2,866,625 | 12/1958 | Sylvest | 34—10 X |
| 3,049,343 | 8/1962 | Helming | 263—32 |
| 3,067,990 | 12/1962 | Zacpal | 263—32 |
| 3,092,471 | 6/1963 | Stromeyer | 34—10 |
| 3,135,588 | 6/1964 | Helming | 34—57 |

FREDERICK L. MATTESON, JR., *Primary Examiner.*

JOHN J. CAMBY, *Examiner.*